United States Patent [19]

Mohan et al.

[11] Patent Number: 5,287,473
[45] Date of Patent: Feb. 15, 1994

[54] NON-BLOCKING SERIALIZATION FOR REMOVING DATA FROM A SHARED CACHE

[75] Inventors: Chandrasekaran Mohan, San Jose; Inderpal S. Narang, Saratoga, both of Calif.

[73] Assignee: International Business Machines Corporation, Armonk, N.Y.

[21] Appl. No.: 627,315

[22] Filed: Dec. 14, 1990

[51] Int. Cl.$^5$ .............................................. G06F 13/14
[52] U.S. Cl. ..................................................... 395/425
[58] Field of Search ............................. 395/400, 425

[56] References Cited

U.S. PATENT DOCUMENTS

| | | | |
|---|---|---|---|
| 4,399,504 | 8/1983 | Obermarck et al. | 364/200 |
| 4,410,944 | 10/1983 | Kronies | 364/200 |
| 4,442,487 | 4/1984 | Fletcher et al. | 364/200 |
| 4,445,191 | 4/1984 | York | 364/900 |
| 4,695,943 | 9/1987 | Keeley et al. | 364/200 |
| 4,809,168 | 2/1989 | Hennessy | 364/200 |
| 4,843,542 | 6/1989 | Dashiell et al. | 364/200 |
| 4,891,749 | 1/1990 | Hoffman et al. | 364/200 |
| 4,897,782 | 1/1990 | Bennett et al. | 364/200 |

FOREIGN PATENT DOCUMENTS

| | | |
|---|---|---|
| 0329942 | 8/1989 | European Pat. Off. . |
| 64-78361 | 6/1988 | Japan . |
| 2-67670 | 9/1988 | Japan . |
| 2-77868 | 9/1988 | Japan . |
| 2-77943 | 9/1988 | Japan . |

OTHER PUBLICATIONS

"Extended Memory Support for High Performance Transaction Systems", V. Bohn et al., May 1990, Technical Report, University Kaiserslautern, Aug. 1990, pp. 1-23.
IBM Technical Disclosure Bulletin, vol. 26, No. 6, Nov. 1983, pp. 2966-2968.
"An Introduction to Database Systems", C. J. Date, vol. 1, Fourth Edition, The Systems Programming Series, Problems of Distributed Systems, pp. 593-595.
"Computer Architecture and Design", A. J. van de Goor, Multiprocessor Systems, pp. 492-507.
"Operating Systems", H. M. Deitel, UNIX, OS/2, MS-DOS Macintosh, VM, MVS, Open Systems, pp. 187-190.

*Primary Examiner*—David L. Robertson
*Attorney, Agent, or Firm*—Baker, Maxham, Jester & Meador

[57] ABSTRACT

A high-speed cache is shared by a plurality of independently-operating data systems in a multi-system data sharing complex. Each data system has access both to the high-speed cache and the lower-speed, secondary storage for obtaining and storing data. Management logic and the high-speed cache assures that a block of data obtained form the cache for entry into the secondary storage will be consistent with the version of the block of data in the shared cache.

7 Claims, 7 Drawing Sheets

NON-BLOCKING SERIALIZATION FOR REMOVING DATA FROM A SHARED CACHE

CROSS REFERENCE TO RELATED APPLICATION

This application is related to co-pending U.S. patent application Ser. No. 07/628,211, filed Dec. 14, 1990 for "NON-BLOCKING SERIALIZATION FOR CACHING DATA IN A SHARED CACHE", the inventors being C. MOHAN ET AL, the assignee being the assignee of this application.

The following, co-pending patent applications, all assigned to the Assignee of this application, contain material related to the material in this application:

U.S. patent application Ser. No. 212,561, filed Jun. 28, 1988;

U.S. patent application Ser. No. 493,581, filed Mar. 14, 1990; and

U.S. patent application Ser. No. 504,766, filed Apr. 4, 1990.

BACKGROUND OF THE INVENTION

This invention relates to a multi-system, data sharing complex and particularly concerns the maintenance of consistency between a cached version of a block of data and a version of the block of data which is being written to secondary storage after being updated.

In a database system wherein a plurality of independently-operating computer systems share data, global locking is required to maintain coherency of data in the different systems. A. J. van de Goor, in COMPUTER ARCHITECTURE AND DESIGN, Addison Wesley, 1989, discusses the data coherency problem as one in which sharing data among a proliferation of processors raises the possibility that multiple, inconsistent copies of data may exist because of multiple paths to the data and because of opportunities to locally modify the data.

Solutions to the data coherency problem have been proposed. All are based essentially on the existence of a global lock on data retrieved from a central location. Assuming pagination of data, one computer system of a multi-computer system which shares data stored on a disk acquires a global lock on a page of data and obtains and updates the page. The lock signifies to the other computer systems that the page has been acquired for updating. Prior to releasing the lock on the page, the computer system holding the lock writes the page to the disk, after which it generates and sends a message to the other computer systems to invalidate any copies of the page which may be held in their local cache. The lock on the page is not released until acknowledgement is received from every other computer system having access to the page. A solution similar to this is described in detail in U.S. Pat. No. 4,399,504, which is assigned to the assignee of this patent application, and which is incorporated herein by reference. A commercial product available from the assignee of this application and which incorporates this solution is the IMS/VS system with the data sharing feature.

The prior art global locking system provides great advantage in maintaining data coherency. However, the overhead penalties inherent in it include the requirement for performing an I/O procedure when a page is updated and undertaking message exchange after the I/O procedure in order to notify the other systems and release the lock.

When used in a non-data-shared single system case, the prior art IBM IMS/VS product still incurs extra overhead in maintaining data coherency (consistency) between transactions by implementing a commit policy requiring each transaction which updates data to write the modified data, together with log records, to storage before the transaction is fully committed. This requires one I/O procedure per page for each modifying transaction, which increases overhead costs.

In contrast, the IBM DB2 in the single system, non-data-sharing case follows a policy which does not require an I/O process to write an updated page back to storage in order to commit a transaction. If the protocol described above is used in the IBM DB2 product in a data-sharing situation where a plurality of computer systems access one or more data storage sites, the performance could degrade significantly because of the required write back to storage and message delay. In this regard, see C. J. Date's discussion of concurrency at pages 593-595 in Vol. I of AN INTRODUCTION TO DATABASE SYSTEMS, Addison-Wessley, 1986.

In a multi-computer, data-sharing system which includes multiple levels of storage, it is contemplated that a secondary level of storage would consist of one or more direct access storage devices (DASD's) which are shared by independently-operating computer systems. Typical nomenclature for hierarchally-arranged storage systems classify DASD and other such storage facilities as "secondary" storage. In this regard, secondary storage includes all facilities from which data must be moved to "primary" storage before it can be directly referenced by a CPU. See Detiel, OPERATING SYSTEMS, Second Edition, 1990, by Addison Wesley. It is further contemplated that caching techniques would be useful to provide a high-speed, frequently-accessed storage for shared data. For various reasons, data would be entered into a shared cache by the database systems after acquisition from DASD's. In this regard, a shared cache would be included in a primary level of storage for a multi-computer, data-sharing system.

In such a structure, a potential hazard would exist if one computer system obtained a block of data from the shared cache for the purpose of writing it to the DASD at the same time that the same block of data is obtained from the shared cache by another computer system, modified, and returned to the shared cache. In this situation, it is assumed that the retrieval of the modified block of data from the shared cache for storage in the DASD is referred to as "casting out" of the block. Relatedly, castout requires that the page being cast out be read from the shared memory, written to DASD, and then marked as unchanged in the shared memory.

For efficient cache management of the shared cache, it is required that shared blocks of data be cast out periodically or based on thresholds of changed blocks in the cache. Once a block is cast out, it is marked as unchanged and becomes a candidate for deletion from the cache. A significant danger arises when the casting out is conducted by one computer system as some second computer system writes a new version of the page to the shared memory during the interval between the read and delete operations. The danger is that the delete will erase the new version of the block. Higher level locking or serialization and queuing in the shared cache are typically used to ensure that this does not happen. The problem with higher level locking is that it doubles the cost for removing the page from the cache because it requires two more multi-system interactions, that is lock and unlock. It will also delay the writing of the modified version by the second system which would produce undesirable performance consequences.

SUMMARY OF THE INVENTION

The primary object of this invention is to provide a method and structure in a shared data, multi-computer system which guarantees that any page of data in a shared cache which is being cast out prior to deletion will not result in deletion of a later version of the page written to the shared memory while the castout operation is in progress.

A significant advantage of the invention is that it does not require higher level locking or serialization and queuing mechanisms in a shared memory to guarantee consistency between page versions when removing a page from the shared memory for entry into secondary storage.

An important object of this invention is to provide a method for operating a multi-system, data-sharing complex in which data is cached in a shared electronic memory. In a multi-system, data-sharing complex, a database system executing on a first computer system could be reading a modified page in a shared cached as a first step to write the page to secondary storage while another database system could be trying to cache an even more recently updated version of the same page in the shared cache The invention detects such a condition and, without a blocking mechanism such as locking, bars deletion of the updated copy of the page from the cache after the first computer system has stored the prior version in secondary storage.

The key innovation of this invention is a technique for operating a shared cache that does not require any additional serialization mechanisms such as higher-level locking to guarantee that a more recent version of a page is not deleted from the cache while an earlier version is written to secondary storage. The cache is accessed by a directory containing a directory entry for each page stored in the cache. Critical to the invention is the provision of a castout lock identification (ID) field in the directory entry for each page in the cache which contains the identification of a computer system currently performing a castout operation. This field operates in conjunction with a change field used to indicate whether the page has been changed. If the change field indicates that the page has been changed during an ongoing castout operation, it prevents deletion of the page, thereby preserving the latest version of the page in the shared cache for a following castout operation. The invention operates by allowing castout only if the castout lock ID field is zero, indicating that no castout is in progress, and by deleting a page only if both the castout lock ID and change bit fields are zero. The invention requires an addition of an operation to the normal read/write set of operations; namely a "read" for cast out operation that enters the identification of the requestor into the castout ID field and sets the change field to zero.

DETAILED DESCRIPTION OF THE PREFERRED EMBODIMENT

The invention provides the structure of a multi-system data sharing complex including a shared cache in the form of a non-volatile electronic memory and a method for operating the cache for sharing data resources while maintaining coherency among several, possibly different, versions of the data.

Figure 1:
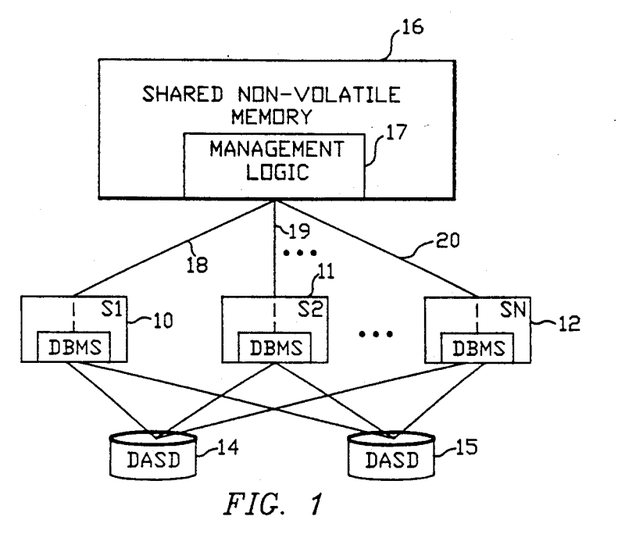
FIG. 1 is a block diagramatic representation of a multi-system data sharing complex including a high-speed, non-volatile fast memory used as a shared cache.

If a data coherency policy in a multi-computer, data-sharing system requires writing of an updated page, an architecture with certain significant characteristics can be used. Such an architecture is illustrated in FIG. 1 and includes a plurality of independently-operating computer systems 10, 11, and 12, which share data stored on direct access storage devices (DASD) 14 and 15. The DASD's 14 and 15 can comprise, for example, multi-disk disk drives. Characteristically, this is referred to as "secondary storage". The architecture includes N computer systems, S1-SN, each including a database management system (DBMS) which controls creation, organization, and modification of a database comprehending data on the DASD's 14 and 15 and which controls access to the data in the database. Also provided in the system is a high-speed non-volatile electronic memory 16 which functions as a cache shared by the computer systems. The memory 16 is attached with high-speed links 18, 19, 20 to the computer systems 10, 11, and 12. Hereinafter, the memory 16 is referred to as either "the memory" or "NV-store".

When comparing access to the memory 16 with access to secondary storage, it is asserted that the memory 16 is a relatively high-speed semi-conductor memory. Further, the attachment of the memory 16 to the computer systems is by way of, for example, fiber optics communication channels which provide very high speed (hundreds of megabytes per second) data transfer. Relatively speaking, an I/O operation conducted at the relatively high-speed memory 16 might take tens of microseconds, while, as is known, I/O with relatively lower-speed DASD's can take tens of milliseconds.

The memory 16 includes management logic 17, preferably in the form of a processor which manages all memory storage operations. The management logic 17 can comprise, for example, a high performance microprocessor with a local program store and private memory, rendering the management logic device capable of engaging in message-based memory access transactions with the computer systems 10, 11, 12.

Respecting the computer systems 10, 11, and 12, these entities can comprise, for example, IBM/3090 Systems, each including a multi-processor architecture with a private cache, and each capable of supporting a database management system of the IMS/VS or DB2 type.

Figure 2:
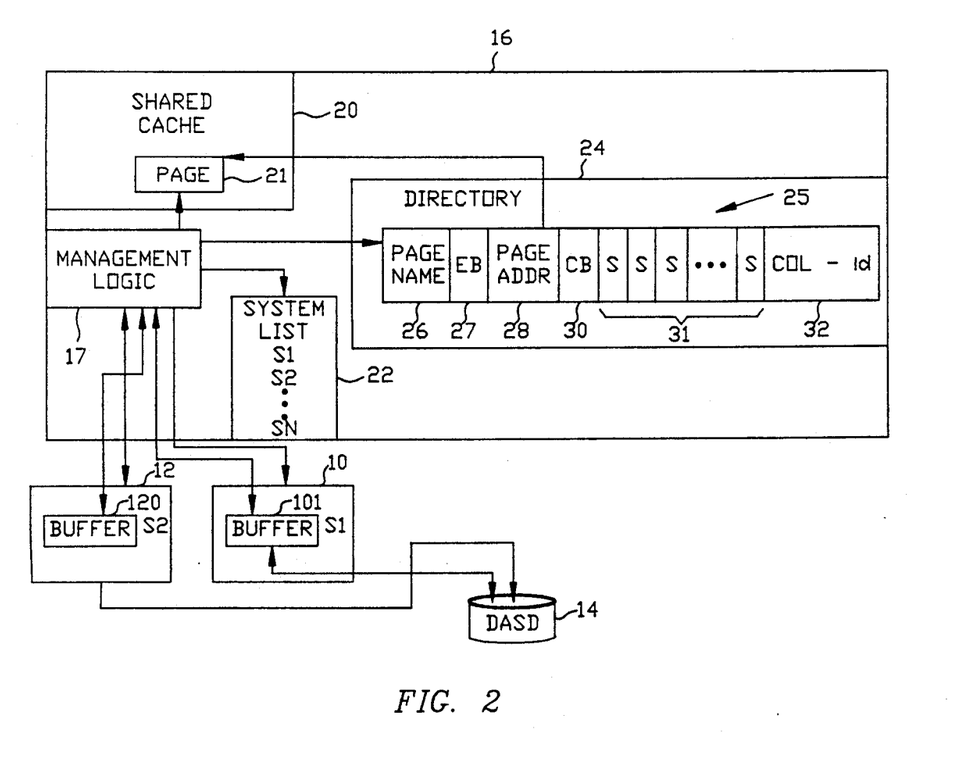
FIG. 2 is a block diagramatic view showing in greater detail the shared memory of FIG. 1 and data structures necessary to practice the invention.

Substantially, the invention is practiced in the data sharing complex illustrated in FIG. 1 and described above. Shown in greater detail in FIG. 2 are structural components required for the practice of the invention. In the memory 16, is found a semi-conductor memory designated as a shared cache 20. The shared cache 20 can comprise conventional, multi-port, high-speed, random access memory which is preferably non-volatile. The shared cache 20 is used for storage of blocks of data. For example, the shared cache 20 can be used to store pages of data, where one such page is indicated by 21.

The management logic 17 has private memory resources for storage and maintenance of a system list 22 and a page directory 24. The list and directory 22 and 24 are accessed conventionally by the management logic 17. For example, well-known hashing lookup mechanisms can be used for accessing these data structures. The system list 22 is a data structure containing a plurality of entries, each entry identifying a computer system which has connected operationally to the memory 16. Assuming, for example, that the computer systems S1, S2, . . . , SN have connected, they will be listed in the system list 22.

The shared cache 20 is operated as a "store-in" cache, as opposed to a "store-through" cache. In this regard, a "store-in" cache is one into which updated pages can be written without the requirement that those pages be written simultaneously into ("stored-through to") secondary storage.

A page cached in the shared cache 20 is identified by a software-assigned name. Therefore, any requests for reading or writing in the shared cache 20 are required to specify the name of the page which is the object of a request. The directory 24 is conventionally indexed by the names of pages which are objects of READ or WRITE commands. A representative entry in the directory 24 is indicated by reference numeral 25. In respect of the invention being described, the fields of the directory 25 which are relevant are shown in FIG. 2. These include a page name field 26, an empty bit (EB) field 27, a page address field 28, a change bit (CB) field 30, a system-valid-bit vector (SV BIT VECTOR) field 31 and a castout lock identification (COL-id) field 32.

The page name field 26 is the field by which the management logic 17 indexes into the directory 24. Assume that the management logic 17 receives a READ or WRITE command, either of which would be accompanied by a value for a parameter P identifying a page. Management logic 17 subjects the value for P to a hashing process which generates a value used by the logic to access the directory quickly via the page name, if it already exists. Once the page name field has been located, the page address field 28 is used to point to the address in the shared cache of the identified page. Preferably, a directory entry is created the first time a read request for the page is received. At this time, the page address field of the directory is left blank until the page is written in a subsequent write operation.

The significance of each of the EB, CB, SV BIT, and castout lock ID (COL-id) fields is given in Table I.

TABLE I

| Empty bit | = 1, | data for the page does not exist in the cache (only the directory entry for the page exists) |

TABLE I-continued

| | = 0, | data for the page exists in the cache at the location indicated in the "Page address in the Cache" field |
|---|---|---|
| Change bit | = 1, | the cached page is changed, i.e., the DASD version of the page is down-level compared to the one in the NV-store |
| | = 0, | the cached page is unchanged, i.e., the DASD version of the page is the same as the one in the NV-store |
| System-Valid-Bit Vector (SVBV) | | One bit per system attached to the cache. If 1, the page cached in the identified systems memory is valid. If 0, the page cached in the system's memory is not valid. The size of this bit array is implementation dependent. |
| Castout Lock ID | = 0, | castout is not in progress |
| | = SI | (non-zero) castout is in progress and is being conducted by system SI |

The management logic 17 creates, manages, and deletes directory entries as necessary. These activities are conducted using known mechanisms, although the precise structure of entries in the directory 24 is unique to this invention. The management logic 17 is also conventionally structured to obtain data from, and enter data into, the shared cache 20, although according to read and write operations which are unique to this invention. The management logic 17 also includes the usual cache management capability to generate "cache miss" and "cache hit" signals. These signals are generated in response to READ commands submitted by the computer systems connected to the shared cache 20. A "cache miss" signal indicates that an identified page does not reside in the shared cache 20, while a "cache hit" signal indicates that an identified page is in the cache 20.

READ and WRITE commands are generated by the computer systems in the multi-system complex of FIG. 1. These commands elicit responses from the management logic 17. The inventors contemplate that commands and responses are exchanged between a computer system and the management logic by any well-known message protocol. Further, the inventors contemplate that access to the shared cache 20 is synchronous in that any computer system issuing a READ or WRITE command maintains a wait state until a response is received from the management logic 17. The speed of the semi-conductor memory forming the shared cache 20 reduces the delay inherent in a synchronous message passing structure.

The inventors also contemplate that the computer systems of the multi-system data sharing complex in FIG. 1 obtain access to DASD's using conventional means, for example, the shared disk capability of an IBM IMS-like system. As is known, such access is asynchronous in that a computer system will not enter a wait state while a READ or WRITE command is dispatched to a DASD.

As FIG. 1 illustrates, the NV-store 16 is not attached directly to any secondary storage device. In this regard, the DBMS of each of the computer systems 10, 11, 12 is aware of the existence of the NV-store 16 and is responsible for what is cached in it. In the system of FIG. 1, an updated page is written to the NV-store explicitly by a DBMS. This is in contrast with a conventional electronic disk cache where the DBMS software issues a disk write where the page is put into the electronic disk cache by hardware transparently to the DBMS.

It is asserted that responsiblity for maintaining stealable pages in the NV-store 16 is delegated to a single one of, or shared collectively by, the DBMS's executing on the computer systems. Management of the page space in the NV-store to ensure availability for new pages is undertaken by periodically writing updated pages from the NV-store to a secondary storage device by castout operations. Preferably, the castout operation is asynchronous to the transaction commit operation since it is desirable to have multiple updates to a page before it is written to secondary storage. Contrastingly, in the electronic disk cache case, the database software is not responsible for castout.

As FIG. 2 illustrates, each computer system includes an identified buffer which is used to stage data exchanged between the computer system and the NV-store 16. For example, the computer system 10 includes a buffer 101, while buffer 120 is provided in the computer system 12. It is asserted that all computer systems of the data sharing complex possess such private buffers. Further, whenever one of the computer systems provides a READ or WRITE command to the management logic 17, it sends an address in its private buffer where the requested data is to be entered or obtained.

The invention concerns the casting out of data from the shared cache to secondary storage while permitting the updating of the data being cast out. When updated, the page is considered "dirty" until it is consistent with its updated version in secondary storage. When the change and empty bits in the directory entry for a page are set to 0, the page is referred to as a "clean page". In this regard, the DASD version of the page is the same as the version of the page in the shared cache 20. In contrast, when the CB for the page is 1, the page is "dirty" and its cached version deviates from (is more recent than) its version in secondary storage.

The invention depends upon a set of unique commands and the registration in affected directory entries of changes resulting from execution of those commands. These commands are described first. Then description is provided as to how these commands support non-blocking serialization to cast out a page in the multi-system data sharing complex of FIG. 1 while maintaining the page's data integrity in the face of the potential for one system to be casting out a page while another system is attempting to cache an updated version of the page. In the practice of the invention, a command whose object is a given page is serialized with other commands for the same page by the management logic in the memory 16.

For the purposes of this disclosure, the memory system 16 of FIG. 1 supports the following commands:

a CONNECT command executed by a software system, such as an instance of a database system in the multi-system data sharing complex of FIG. 1, connecting to the NV-store 16. In response to a CONNECT command, the management logic 17 enters the identification of the connecting system into the system list 22 and provides a field for the connecting system in the SV bit vector of every entry currently in the directory 24 and every entry thereafter made;

READ PAGE (S, P, Buffer Address), where S identifies the system issuing the command, P identifies the requested page, and Buffer Address denotes the address in the buffer of the system where the page is to be delivered;

WRITE PAGE (S, P, CB=1, Buffer Address) This command is also referred to as an "unconditional" WRITE. When a WRITE PAGE command is issued, the parameters input with the command include a CB parameter corresponding to the CB field for the identified page. The udated nature of the page being written is indicated by setting the change bit to 1; and CONDITIONAL WRITE (S, P, CB=0, Buffer, Address) The CONDITIONAL WRITE command is used to "cast in" or enter into the NV-store a page which the conditionally writing computer system has obtained from the secondary storage. CB=0 indicates that the page is unmodified;

READ FOR CASTOUT (S,P, Buffer Address) This command initiates castout processing for page P. To cast out page P, the DBMS in system S requests the management logic to send P from NV-store to the Buffer Address in system S. The system then writes the page to disk. After disk I/O, the DBMS issues the UNLOCK-CASTOUT ID command; and UNLOCK-CASTOUT ID (S,P) This command tells NV-store that the page P has been successfully written to secondary storage (cast out).

Figure 3:
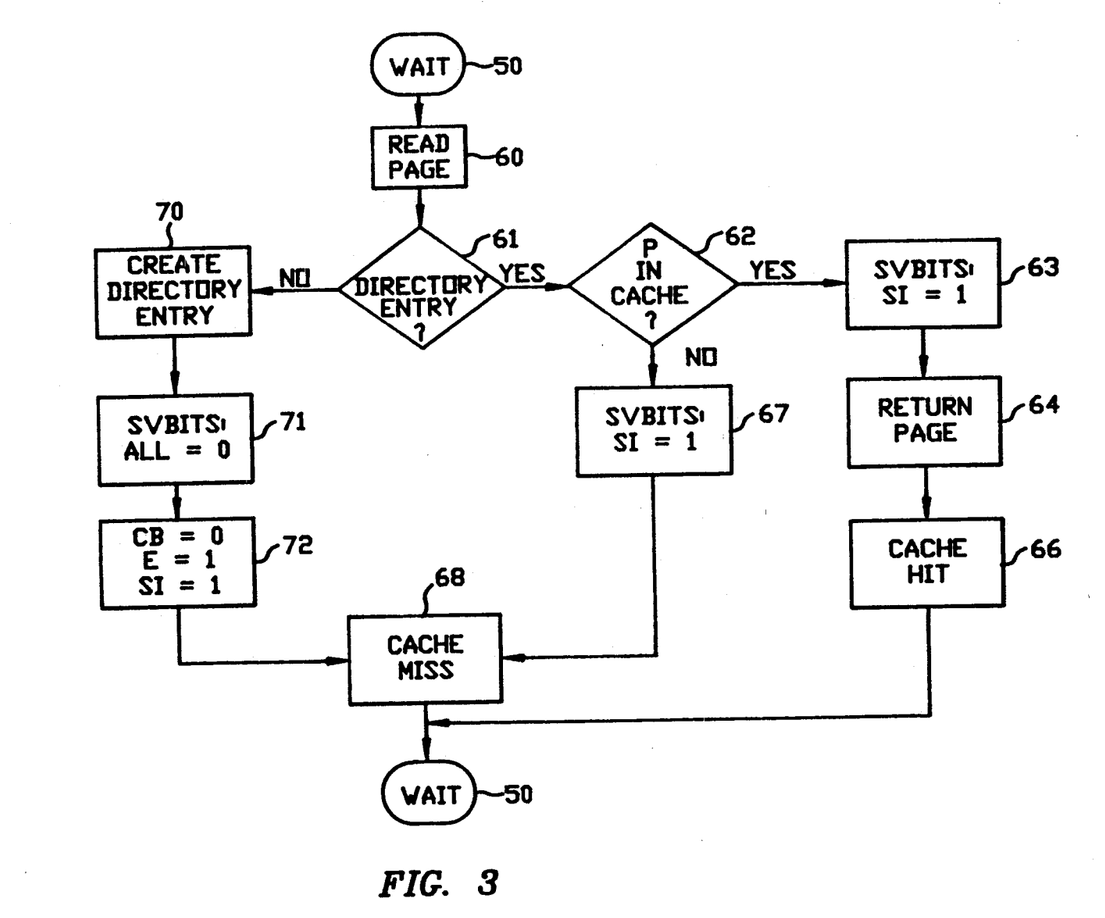
FIG. 3 is a flow diagram representing process flow for a READ command.

In FIG. 3, the operational flow for management logic processing in response to a READ PAGE command is illustrated. Initially, the management logic 17 is in a WAIT state 50 from which it can exit to any one of at least three processes, including the UNCONDITIONAL WRITE, CONDITIONAL WRITE, or READ PAGE processes. In FIG. 3, it is assumed that a READ command having the form illustrated above has been received. This is signified by READ process step 60. In providing a READ PAGE command, the issuing computer system identifies itself (SI, that is, the ith system) the requested page (P), and the Buffer Address in the computer system to which the read page is to be delivered. The read process undertaken by the management logic 17 has three possible cases.

The first case occurs if an entry for the identified page P exists in the directory 24 and the page's E bit is set to 0, signifying that the requested page is in the shared cache 20. These conditions are tested in decisions 61 and 62, respectively. Assuming the positive exit from both decisions, the read process sets the bit corresponding to the identified ith computing system (SI) in the SV bit vector of the entry to 1 in step 63, returns the data page at the specified Buffer Address in step 64, and returns a cache hit indication in step 66.

The significance of this case is that any time a read request is issued for a page which is already in the shared cache 20, the page will be unconditionally returned to the requestor with a cache hit indication. The S bit for the requestor is conditioned to a first state (1) in order to indicate that the copy of page P possessed by the system is current.

In the second case, it is assumed that an entry exists for the page P in the directory 24, but that the page has not yet been entered in the shared cache 20. In this case, following the read page step 60, the positive exit is taken from the decision 61 and the negative exit from the decision 62. Now, the S bit for the requesting system is conditioned to the first state (that is, to a "1") and a cache miss is issued. In this case, a previous READ PAGE command has been received by the management logic 17 resulting in creation of a directory entry, but the page has not yet been brought up from DASD and put into the shared cache.

In the last case, a directory entry for page P does not exist, and management logic 17 follows the negative exit from the decision 61 and executes steps 70, 71, and 72 in sequence. In this regard, in step 70, the management logic creates a directory entry for the page P (assuming available storage), initially conditions the entire SV bit vector for the created entry to a second state (preferably, "0"). Then, the E bit is set to 1, CB is set to 0, and the S bit for the requesting system is conditioned to the first state. Last, a cache miss is issued in step 68 and the logic enters the wait state.

In this last case, system SI has lodged the first READ request for page P; any following READ request before the page is entered into the shared cache 20 will follow procedure steps 60, 61, 62, 67, 68. Once the requested page has been moved up to the shared cache 20 from DASD, a READ request will follow steps 60, 61, 62, 63, 64, 66.

Figure 4:
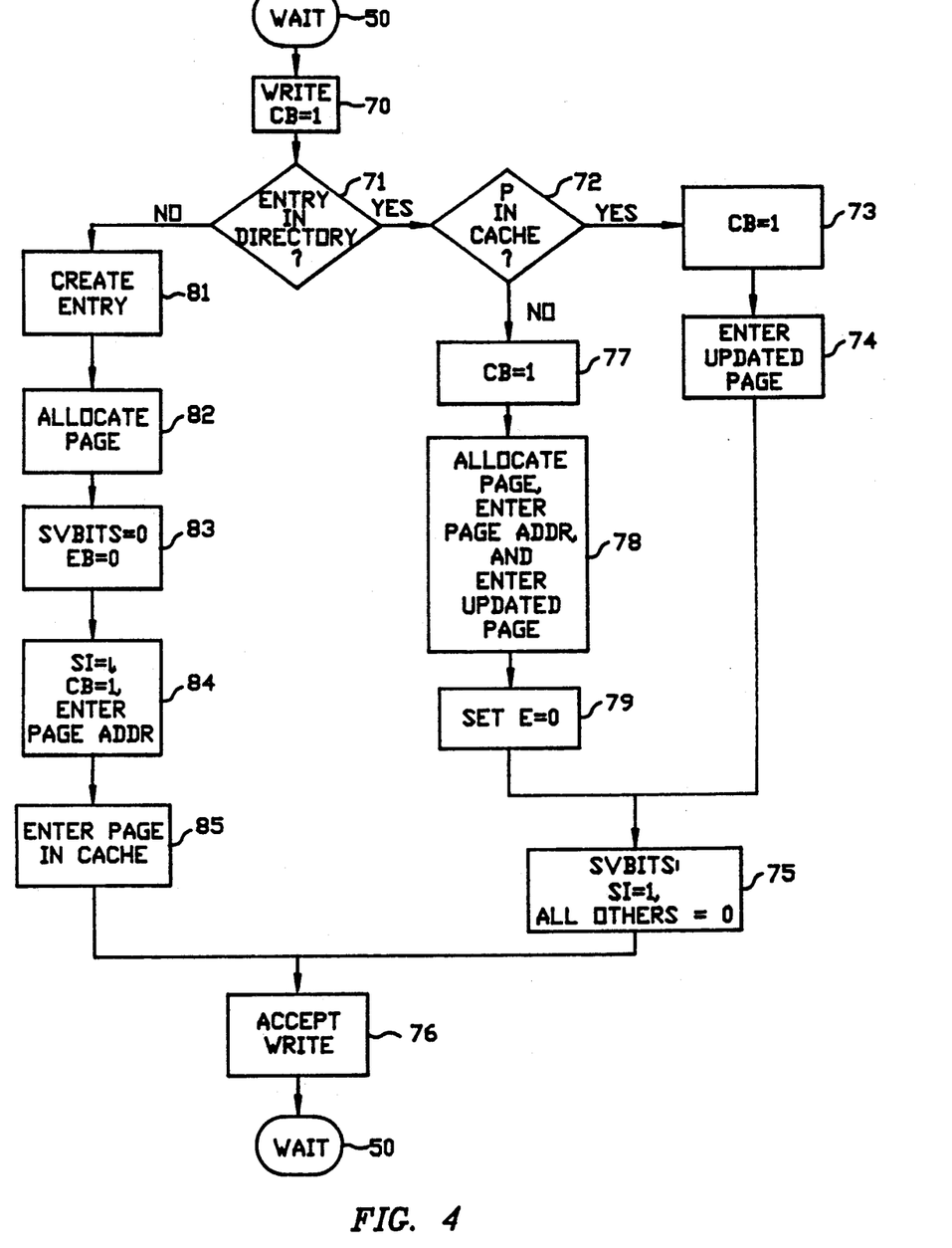
FIG. 4 is a flow diagram representing process flow for an unconditional WRITE command.

The process employed by the management logic for writing an updated page to the shared cache 20 is illustrated in FIG. 4. A page may be updated after being retrieved from the shared cache 20 by a READ PAGE command. Alternately, a page may be updated after being obtained from a DASD, but before the page is ever entered into the shared cache 20. Assume that system SI has acquired the page P, has updated the page, and now must write the page into the shared cache 20. System SI will issue the WRITE command with CB=1 to write the updated page P. The processing undertaken by management logic in response to this WRITE command is illustrated in FIG. 4. In FIG. 4, there are three possible cases: an entry for the page P exists in the directory 24 and E=0 (the page is in the shared cache 20); the entry for page P exists, but the page has not yet been entered in any form into the shared cache 20; or, an entry does not exist for the page P in the directory.

In the first case, the write process undertaken by the management logic 17 (FIG. 4) moves through the sequence 70, 71, 72 and then executes steps 73, 74, 75, and 76. In step 73, the CB field of the directory entry for page P is set to 1. Next, in step 74, the existing version of page P is overwritten with the data at the Buffer Address provided with the WRITE command. Then, all S bits in the SV BIT VECTOR for the page's data entry are set to 0 except the S bit for the system issuing the WRITE command. Upon exiting step 75, the management logic returns an acceptance of the command to the requesting system in step 76 and then enters the wait state 50. In the second case, where there is a directory entry for the page P, but the page is not in the shared cache, the management logic process 17 moves from the wait state 50 through steps 70 and 71, takes the negative exit from decision 72, and executes steps 77, 78, 79, 75 and 76. In step 77, the change bit in the directory entry for the requested page is set to 1. In step 78, space is allocated for page P in the shared cache 20, the data is moved to the allocated space from the Buffer Address of system SI, and the cache address of the page is placed in the page address field of the page's directory entry. Next, in step 79, the empty bit is set to 0 in page P's directory entry and step 75 is executed, following which the logic returns an acceptance of the command and 50.

In the last case, when there is no directory entry for page P, the negative exit is taken from the decision 71 and steps 81–85 and 76 are executed, following which the logic enters the wait state 50. In step 81, a directory entry is created for page P, and in step 82, space is allocated in the shared cache for entry of the page. In steps 83 and 84, relevant bits in the directory entry are conditioned. In step 83, all bits in the page's SV bit vector are initialized to 0 and the E bit is set to 0. Next, in step 84, the S bit for the requesting system (bit SI) is conditioned to a 1 and the change bit is also set to a 1, indicating that the page has been changed, and the page's address is placed in the entry. In step 85, the directory entry for page P is entered into the directory and the page is placed into the cache at the allocated location. The logic then returns an acceptance and enters the wait state.

It is observed that the write process of FIG. 4 is unconditional in that the request is never rejected. Further, execution of any one of the WRITE cases will result in setting the change bit for the affected page and zeroing all bits of the SV bit vector for the affected page, save the bit for the writing computer system. As will be seen from the following description of the CONDITIONAL WRITE, zeroing the S bits for non-writing computer systems during a WRITE will prevent entry of down-level pages into the shared cache. However, the WRITE does not prevent the completion of later-occurring UNCONDITIONAL WRITES. In order to ensure that at any time only one system is modifying a page, the inventors contemplate that a WRITE lock would be acquired by the writing system.

Figure 5:
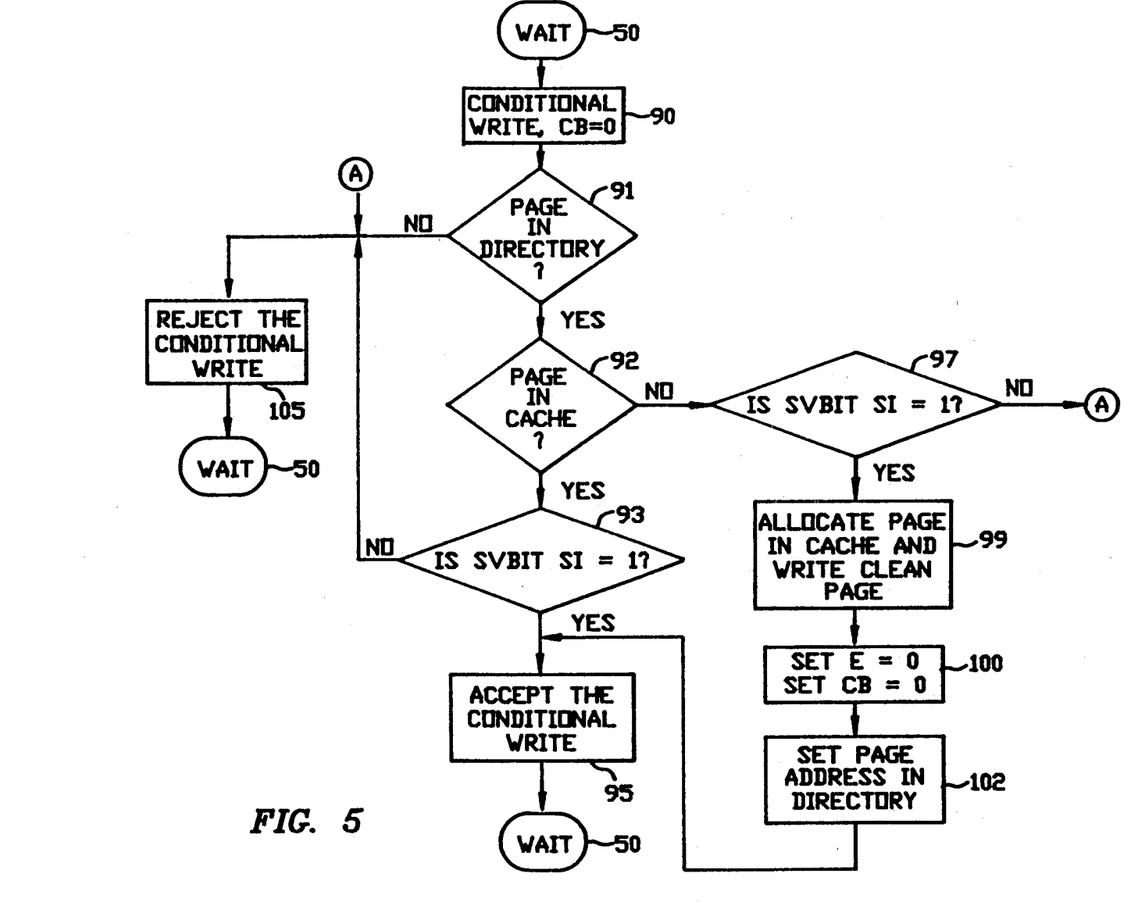
FIG. 5 is a flow diagram representing process flow for a CONDITIONAL WRITE command.

Refer now to FIG. 5 for an understanding of the CONDITIONAL WRITE processing embodied in the management logic 17. In this processing, it is assumed that system SI has received a cache miss from the NV-store and has then obtained a page from the secondary storage, has not changed it, and is preparing to cache it in the shared cache 20. In the parameter set sent to the management logic 17, system SI sets the change bit to 0, which signifies that the page in the possession of the computer system is equivalent to the secondary storage version of the page. System SI issues a CONDITIONAL WRITE command with CB equal to 0. Again, there are three cases.

In the first case, a directory entry for the page and the page itself exist in the cache. The command is responded to in step 90 and the directory 24 is checked for an entry corresponding to page P. Assuming the page is in the directory, the positive exit is taken from step 91 and in step 92 the empty bit of the entry is checked to determine whether the page is in the cache. Assuming the positive exit from decision 92, the page would be in the cache. At this point, the S bit for system SI is checked in the SV bit vector of the page entry to determine whether another system has changed the page. If bit SI is set to 1, no change to the page has occurred and the positive exit is taken from decision 93. Now, the management logic 17 has determined that the page is in the cache, that the page submitted by SI is equivalent to the page in the cache, and that no overwriting of the page is required. Thus, the management logic 17 will return the appropriate code to signify acceptance of the CONDITIONAL WRITE in step 95. Note, however, that no data will be transferred from the memory of the system SI to the shared cache 20. The logic then enters the wait state. If the negative exit is taken at decision 93, then the command is rejected in step 105 and the logic enters the wait state.

In the second case, a directory entry exists for page P and the positive exit is taken from step 91. However, assume that in step 92 the management logic 17 determines that the page is not in the cache and takes the negative exit from decision 92, next encountering decision 97. In decision 97, bit SI of the SV bit vector for page P is checked. If the bit has been set to 1, system SI is in possession of a valid page. At this point, the positive exit is taken from the decision 97. Space is allocated in the shared cache and the page data is moved from the Buffer Address of system SI to the allocated space. In step 100, the E bit is set to 0 and the CB bit is set to 0. In step 102, the page address is set in the directory entry and the entry is placed in the directory. Last, the management logic returns an acceptance of the CONDITIONAL WRITE to system SI and enters the wait state.

In this case, assume that the outcome of the decision at 97 is negative. Now, system SI is not in possession of a valid page and the conditional write processing is terminated through step 105, the management logic 17 returning the rejection of the CONDITIONAL WRITE command to system SI and then entering the wait state 50.

Last, if the management logic determines in response to a received CONDITIONAL WRITE command that no entry has been made for page P in the directory 24, the negative exit is taken from decision 91, command processing is terminated and the command is rejected in step 105, the management logic then entering the wait state 50.

With these commands, it should be obvious that the SV bit vector and change bit fields effectively serialize the casting in of pages to the shared cache 20 with the guarantee that, once a page is cast in and changed, a later down-level version of the page obtained from the secondary storage will not overwrite an updated version of the page in the shared cache. The guarantee is advanced by the non-blocking serialization protocol for moving a page obtained from secondary storage into the shared cache. The protocol works well because the NV-store begins tracking caching of the page (in the SV bit vector) at the first READ PAGE command issued, even if the command results in a cache miss owing to the absence of the directory entry or data. An unconditional WRITE command by another system will set the change bit for page P and reset the S bit of all systems other than the writing system in the page's SV bit vector. Processing of a subsequent CONDITIONAL WRITE command will key on: a) the writing system's S bit in the SV bit vector; or, b) absence of a directory entry for the page. The NV-store rejects the CONDITIONAL WRITE command in both cases.

Once an updated page is written to the cache 20, the problem remains how to ensure that a version of the page being cast out does not cause deletion of a more current version of the page in the shared cache. The invention utilizes the READ FOR CASTOUT and UNLOCK CASTOUT LOCK commands in a protocol which guarantees that the castout operation in the multi-system, data-sharing complex of FIG. 1 will not delete from the shared cache 20 an updated version of a page when a previous version of the page is being cast out to secondary storage. This guarantee is effective even in the face of a possibility that the page may be updated while castout is occurring.

Figure 6:
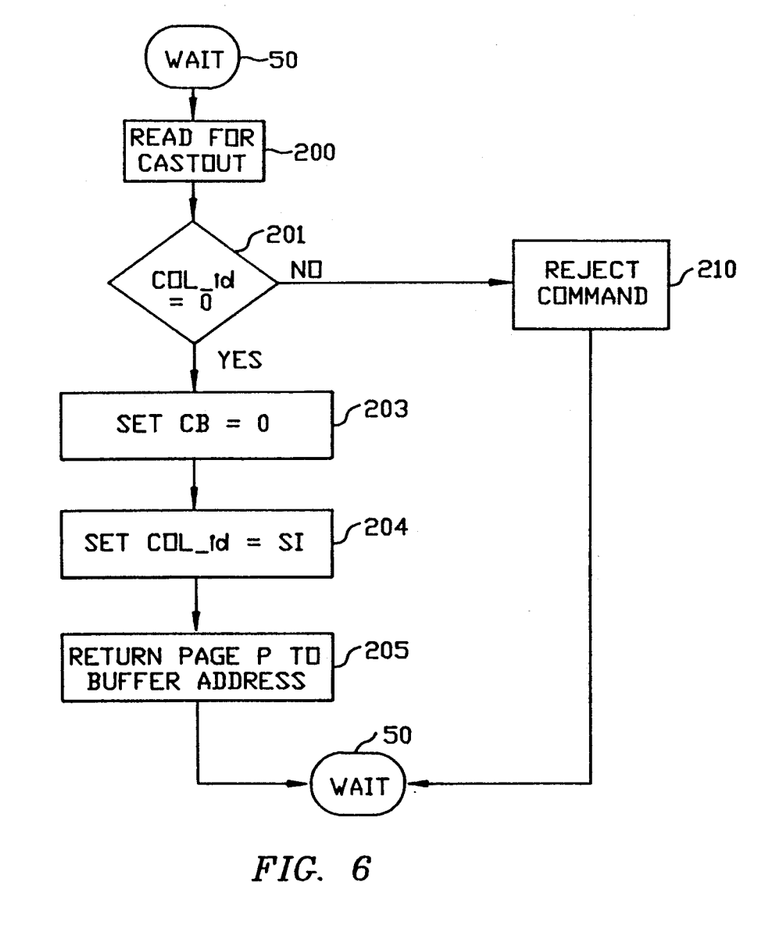
FIG. 6 is a flow diagram representing a process flow for a READ FOR CASTOUT command.

The command processing in the READ FOR CASTOUT command is illustrated in FIG. 6. Initially, the management logic 17 is in the wait state 50 from which it transitions in response to a receipt of a READ FOR CASTOUT command from system SI for page P. In response to receipt of the command, the management logic checks the COL-id field of the directory entry for page P. If the COL-id field is empty (preferably denoted by a value of 0), the management logic takes a positive exit from decision 201, sets the CB field in the directory entry for page P to 0 in step 203, and enters the identification of the requesting system into the COL-id field of the entry in step 204. The logic then returns the copy of page P which is in shared cache 20 to the Buffer Address specified in the command parameter set in step 205 and enters the wait state at 50. At this point, the DBMS in system SI will begin a process for writing the version of page P in its buffer to the secondary storage.

The negative exit from decision 201 provides for the possibility that another system is conducting a castout operation, in which case the COL-id field value will be non-zero and the negative exit will be followed from decision 201. If the COL-id field is non-zero, system is conducting a cast out operation and the management logic 17 will reject the command in step 210 and return to the wait state 50.

Figure 7:
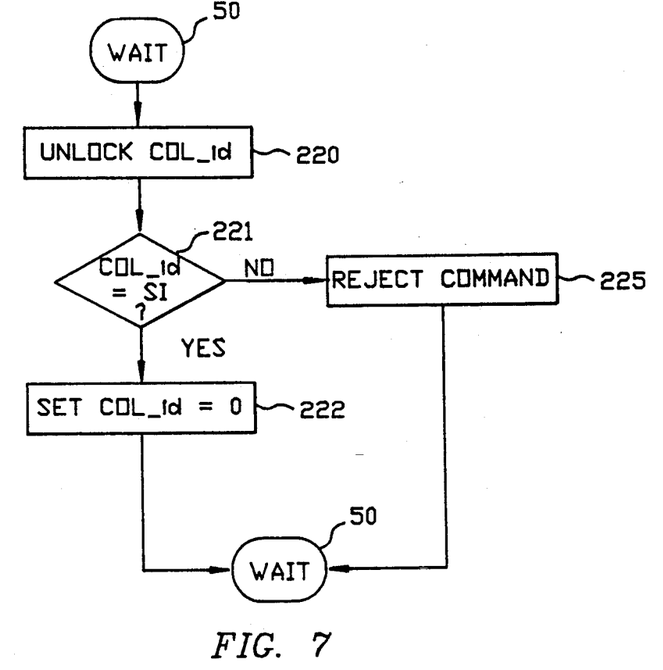
FIG. 7 is a flow diagram representing process flow for an UNLOCK CASTOUT LOCK IDENTIFICATION command.

FIG. 7 illustrates management logic processing for the UNLOCK CASTOUT LOCK command. Initially, the management logic 17 is in the wait state 50. Upon receiving the UNLOCK CASTOUT LOCK command (UNLOCK COL-id) in step 220, it compares the entry in the COL-id field of page P with SI, the identification of the system issuing the command. Equality of the values signifies that the requesting system is the one which initiated the cast out process with a READ FOR CAST OUT command. If the values are equal, the positive exit is taken from decision 221, the COL-id field is set to 0 in step 222, and the management logic enters wait state 50. Admitting the possibility of a software error in non-equality of the COL-id and system id values, the negative exit is provided from decision 221 leading to rejection of the command in step 225 and re-entry of the wait state 50.

Figure 8:
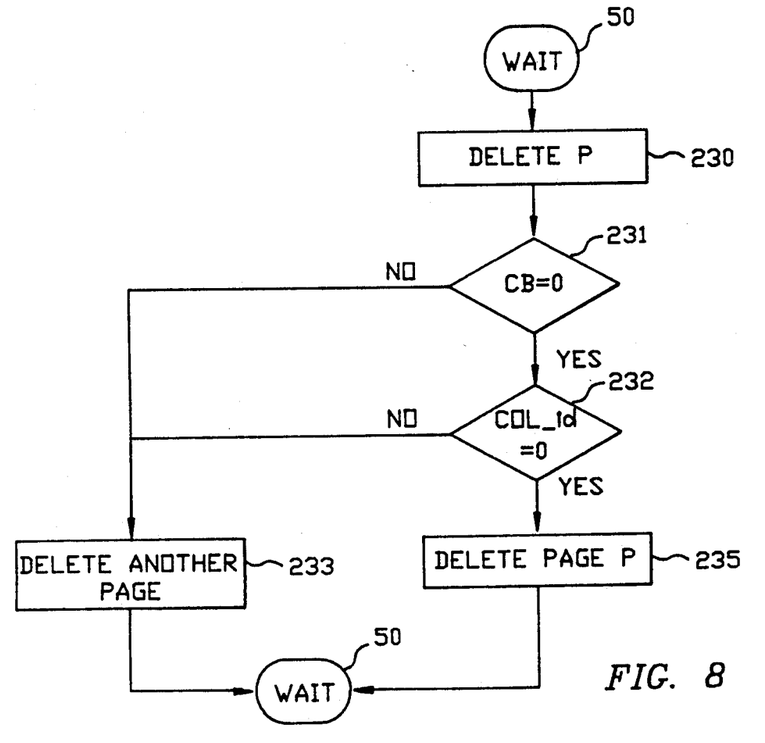
FIG. 8 illustrates how the invention prevents the deletion from a shared cache of a page updated during, but prior to the conclusion of, a castout operation.

FIG. 8 shows processing for deletion of a page which has been cast out by use of the commands illustrated in FIG. 6 and 7. Relatedly, "deletion: means removal of a directory entry and appropriation of the cache space pointed to by the directory. The inventors contemplate that any appropriate DELETE process which is internal in the management logic 17 would be employed to appropriate cache space holding page P and to remove its associated directory entry from the directory. Necessarily, the delete process would depend upon completion of a READ FOR CASTOUT/UNLOCK CASTOUT LOCK sequence, following which the castout page P would be deleted. FIG. 8 illustrates how the castout the castout process provides against deletion of a page which has been updated by a WRITE command during the castout process. FIG. 8 does not assume that the deletion necessarily immediately follows the castout.

In FIG. 8, a DELETE process is invoked internally in the management logic 17 to delete page P from the shared cache 20 when a directory entry has to be created and no free entry is available. This is step 230. The delete processing would first inspect the CB field of the directory entry for page P and then the COL-id field of the entry. These are decisions 231 and 232. In decision 231, if the change bit has been set to 1, the inference drawn is that the version of page P in the shared cache and the version in secondary storage are inconsistent, in which case, castout processing to write the shared cache version to secondary storage would have to be initiated. In this case, the negative exit is taken from decision 231. In decision 232, it is possible that a castout process has begun by execution of a READ FOR CASTOUT command but that the process has not been completed by execution of the following UNLOCK CASTOUT LOCK. In this case, the COL-id field would be non-zero and the delete process would terminate by following the negative exit from decision 232. The negative exits from decisions 231 and 232 join in step 233 in which the entry would not be deleted. Assuming the positive exit from each of the decisions 231 and 232, the conditions of consistency between shared cache and secondary storage versions and completion of a castout process would be met and the directory entry for the page P would be deleted in step 235 from the directory 24. At this time, the appropriate cache management policy could be invoked to steal the cache space allocated to the page P.

OPERATION OF THE INVENTION

Figure 9:
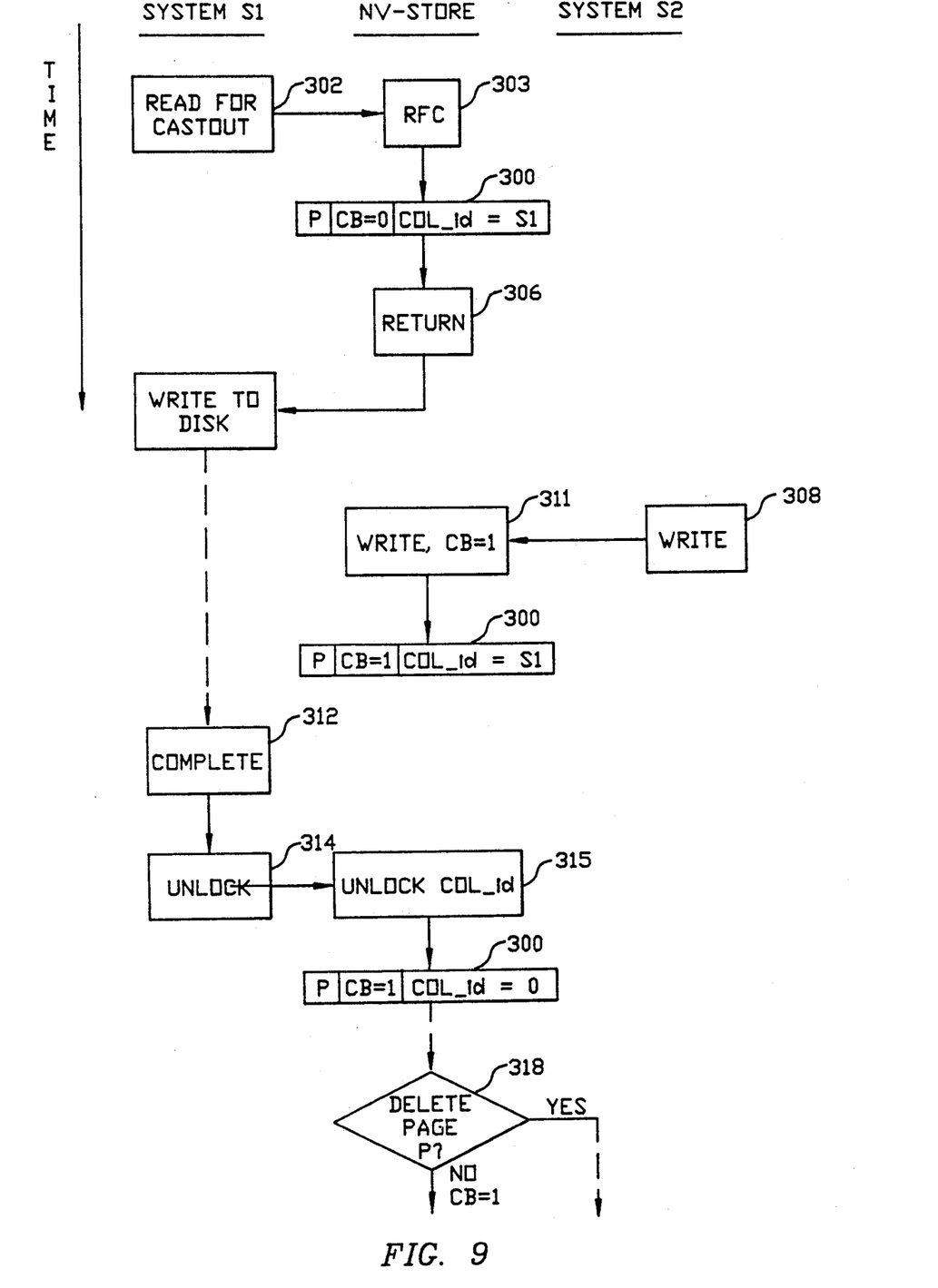
FIG. 9 is a flow diagram illustrating the method of the invention.

FIG. 9 shows the operation of a castout process employing the READ FOR CASTOUT (RFC) and UNLOCK CASTOUT LOCK (UNLOCK) commands. The guarantee of consistency between the shared cache and secondary storage versions of the page P is illustrated in the operation by a WRITE command which occurs between the RFC and UNLOCK commands. The operation is illustrated with reference to a representation of a directory entry for page P which shows only the page identification P, the change bit CB, and the COL-id fields for the entry. The directory entry for page P is indicated by reference numeral 300. In addition, time unfolds vertically along the arrow marked TIME.

In FIG. 9, assume system S1 begins a castout process by issuing a READ FOR CASTOUT command 302 which initiates the RFC processing illustrated in FIG. 6. In processing the command, the NV-store management logic sets the change bit to 0 and enters the identification of system 1 (S1) in the COL-id field of page P's directory entry. The management logic returns a copy of page P from the shared cache to the buffer of system S1. System S1 then at 307 initiates a WRITE TO DISK I/O process for entering the copy of page P into the secondary storage. In the meantime, system S2 executes a WRITE command 308 after the RFC process has been completed, but before the WRITE TO DISK process 307 has been completed. System S2 indicates a CB value of 1 for the directory entry of page P and the CB field of the entry 300 is changed to this value during the WRITE process 311 conducted by the management logic according to FIG. 4. At this point, an updated version of page P which is being written to secondary storage exists in the shared cache, introducing inconsistency between it and the version being cast out by system S1.

Some time after execution of the WRITE command 308, the WRITE TO DISK 307 at system S1 is completed (312). Now, system S1 issues an UNLOCK CASTOUT LOCK command 314, initiating corresponding processing by the management at 315. During the processing 315, the management logic zeros the COL-id field of the directory entry 300, which unlocks page P for another castout process. The key point to note is that the UNLOCK CASTOUT LOCK command does not cause the CB field in directory entry 300 to be reset. This prevents the management logic 17 from deleting page P as shown in FIG. 8. The newer version of P would be cast out by the castout process initiated later by S1 or S2. Thus, if the management logic attempts in step 318 to delete page P, deletion of page P is prevented and another page is considered for deletion.

BEST MODE

The inventors contemplate that the best system for practicing the invention is that illustrated in FIG. 1 and described above. Presently, the invention would be practiced in the form of programming of the management logic 17 and the database management systems of the computer systems 10, 11, and 12. Such programming is derivable from the process flow diagrams of FIGS. 3-8, the operational flow diagram of FIG. 9, and the explanations given hereinabove. In this regard, the management logic 17 would be practicable as a mechanism for non-blocking serialization between write and castout of a page in the shared cache 20 of FIG. 2. This is not to obviate the possibility that the management logic could be partially or entirely hard-wired with circuitry which is derivable from the explanation given above and the flow diagrams.

Manifestly, any of those reasonably skilled in the art will understand that, although the invention has been shown and described in respect of specific embodiments thereof, various changes and omissions in the form and details the invention may be made without departing form the spirit and scope of the invention.

We claim:

1. In a combination including a relatively high-speed memory, management logic means for providing data from the memory, for generating data counterparts for blocks of data in the memory, and for deleting blocks of data from the memory, at least one relatively low-speed storage facility for storing data, and a plurality of computer systems connected to the management logic means, to the memory and to the storage facility, a method for serializing the removal of data from the memory for storage in the storage facility, the method comprising the steps of:

the management logic means generating a data counterpart for a block of data and storing the data counterpart at the memory, the data counterpart including a change bit field and a castout identification field;

providing a READ FOR CASTOUT command from a first computer system to the management logic means to enable the first computer system to obtain the block of data for entry into the storage facility;

in response to the READ FOR CASTOUT command, the management logic means setting the change bit field to indicate correspondence between the version of the block of data in the memory and a version of the block of data in the storage facility and setting the castout identification field of the data counterpart to a value identifying the first computer system; and preventing the management logic means from deleting the block of data from the memory in response to the value in the castout identification field.

2. The method of claim 1 further including the steps of:

issuing a WRITE command from a second computer system to the management logic means for changing the version of the block of data in the memory;

in response to the WRITE command, the management logic means changing the change bit field to indicate disparity between the version of the block of data in the memory and the version of the block of data in the storage facility; and the indicated disparity in the change bit field preventing the management logic means from deleting the block of data from the memory.

3. The method of claim 2, further comprising the steps of:

when the first computer system enters the block of data into the storage facility, the management logic means deleting the value from the castout identification field, and, then (a) after prevention of the deletion of the block of data from memory, providing a READ FOR CASTOUT command from a computer system to the management logic means for obtaining the updated version of the block of data in the memory;

(b) in response to the READ FOR CASTOUT command, the management logic means setting the change bit field to indicate correspondence between the version of the block of data in the memory and a version of the block of data in the storage facility and setting the castout identification field of the data counterpart to a value identifying the computer system;

(c) at the computer system, writing the updated version of the block of data to the storage facility;

(d) in response to writing the updated version of the block of data to the storage facility, the management logic means deleting the value identifying the computer system from the castout identification field;

(e) if the change bit filed indicates correspondence between the version of the block of data in the memory and the version of the block of data in the storage facility, the management logic means deleting the bloc of data from the memory; otherwise, performing steps (a)–(e) until the block of data has been deleted from the memory.

4. In a multi-computer, data sharing system including a relatively high-speed cache, management means for controlling access to blocks of data in the cache and for deleting blocks of data from the cache, a relatively low speed storage facility, and a plurality of computer systems connected to the storage facility, to the management means, and to the cache, a method for controlling removal of data from the cache, including the steps of:

a first computer system reading a block of data from the cache for entry into the storage facility;

if the block of data is changed in the cache by a second computer system while the first computer system is entering it into the storage facility, the management means preventing deletion of the block of data from the cache; otherwise, the management means deleting the block of data from the cache.

5. In a multi-computer, data sharing system including a relatively high-speed cache, management means for controlling access to blocks of data in the cache and for deleting blocks of data from the cache, a relatively low speed storage facility, and a plurality of computer systems connected to the storage facility, to the management means and to the cache, a method for controlling removal of data from the cache, including the steps of:

the management means creating a data counterpart to a block of data in the cache, the data counterpart including a castout lock field for containing the identification of a computer system which obtains the block of data for entry into the storage facility;

(a) if the castout lock field contains identification of a computer system, preventing the management means from deleting the block of data from the cache;

(b) if the block of data in the cache is not consistent with a version of the block of data in the storage facility, preventing the management means from deleting the block of data from the cache; otherwise (c) the management means deleting the block of data from the cache.

6. The method of claim 5 wherein the steps (a) and (b) are repeated in sequence until the block of data is deleted in step (c).

7. In a combination including a relatively high-speed memory, management logic means for providing data from the memory in response to requests and for maintaining a directory containing data counterparts of blocks of data in the memory, at least one relatively low-speed storage facility for storing data, and a plurality of computer systems connected to the memory, to the management logic means, and to the storage facility, a READ process for serializing the movement of blocks of data from the memory to the storage facility, the method comprising the steps of:

the management logic means generating a data counterpart for a block of data in the memory, the data counterpart including a change field for indicating whether or not the block of data is consistent with a version of a block of data in the storage facility and an identification field for identifying a computer system which has obtained the block of data for entry into the storage facility;

the management logic means entering the data counterpart into the directory;

issuing a request from a first computer system to the management logic means for obtaining the block of data from the memory for entry into the storage facility;

in response to the request, the management logic means setting the change field to indicate consistency between the block of data in the memory and the version of the block of data in the storage facility and entering the identification of the first computer system into the identification field;

at the first computer system, entering the block of data into the storage facility;

after entry of the block of data into the storage facility, the management logic means removing the first computer system's identification from the identification field; and if the change field indicates disparity between the block of data and the memory of the block of data in the storage facility, preventing the management logic means from deleting the block of data from the memory; otherwise the management logic means deleting the block of data from the memory by removing the data counterpart from the directory.

* * * * *

UNITED STATES PATENT AND TRADEMARK OFFICE
Certificate

Patent No. 5,287,473                                          Patented: February 15, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chandrasekaran Mohan, San Jose, CA; Inderpal S. Narang, Saratoga, CA; Jeffrey Alan Frey, New Paltz, NY; John Franklin Isenberg, Jr., Poughkeepsie, NY; Jeffrey Mark Nick, Fishkill, NY; Jimmy Paul Strickland, Saratoga, CA; and Michael Dustin Swanson, Poughkeepsie, NY.

Signed and Sealed this Twenty-Ninth Day of June, 1999.

JOHN W. CABECA
*Supervisory Patent Examiner*
Art Unit 2752